United States Patent
Gupta et al.

(10) Patent No.: US 10,945,120 B2
(45) Date of Patent: Mar. 9, 2021

(54) METHODS, SYSTEMS, AND COMPUTER READABLE MEDIA FOR DYNAMICALLY PROVISIONING AND USING PUBLIC LAND MOBILE NETWORK (PLMN) LOCATION MAPPINGS IN SERVICE CAPABILITY EXPOSURE FUNCTION (SCEF) OR NETWORK EXPOSURE FUNCTION (NEF)

(71) Applicant: Oracle International Corporation, Redwood Shores, CA (US)

(72) Inventors: Nitin Gupta, Bangalore (IN); Raghuvamshi vasudev Singh Thakur, Bangalore (IN); Venkatesh Aravamudhan, Bangalore (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 16/287,808

(22) Filed: Feb. 27, 2019

(65) Prior Publication Data
US 2020/0275257 A1 Aug. 27, 2020

(51) Int. Cl.
*H04W 4/00* (2018.01)
*H04W 8/22* (2009.01)
(Continued)

(52) U.S. Cl.
CPC .............. *H04W 8/22* (2013.01); *H04W 4/029* (2018.02); *H04W 8/08* (2013.01); *H04W 24/08* (2013.01);
(Continued)

(58) Field of Classification Search
CPC ......... H04W 8/22; H04W 4/029; H04W 8/08; H04W 24/08; H04W 64/003;
(Continued)

(56) References Cited

U.S. PATENT DOCUMENTS 6,119,000 A * 9/2000 Stephenson ............. H04M 3/36
455/432.1
7,535,915 B2 5/2009 Collins
(Continued)

FOREIGN PATENT DOCUMENTS

WO WO 2019/062596 A1 4/2019
WO WO 2019/076273 A1 4/2019
(Continued)

OTHER PUBLICATIONS

Commonly-assigned, co-pending U.S. Appl. No. 16/280,672 for Methods, Systems, and Computer Readable Media for (IoT) Device State Through Service Capability Exposure Function (SCEF) (Unpublished, filed Feb. 20, 2019).
(Continued)

*Primary Examiner* — Stephen M D Agosta
(74) *Attorney, Agent, or Firm* — Jenkins, Wilson, Taylor & Hunt, P.A.

(57) ABSTRACT

A method for dynamically provisioning and using PLMN location mappings includes, in an SCEF or NEF, receiving, from a PLMN network node, a message containing a PLMN location identifier and a non-PLMN location identifier, extracting the PLMN location identifier and the non-PLMN location identifier from the message and storing, in a PLMN location mapping database in the SCEF or NEF, a mapping between the PLMN location identifier and the non-PLMN location identifier. The method further includes receiving, via a monitoring interface of the SCEF or NEF, a monitoring request message requesting IoT device information and including a non-PLMN location identifier. The method further includes locating an entry in the PLMN location mapping database corresponding to the non-PLMN location identifier, extracting a PLMN location identifier from the database, using the PLMN location identifier extracted from the database to obtain IoT device information, and respond-
(Continued)

ing to the monitoring request message with the IoT device information.

18 Claims, 9 Drawing Sheets

(51) Int. Cl.
| | |
|---|---|
| *H04W 4/029* | (2018.01) |
| *H04W 8/08* | (2009.01) |
| *H04W 24/08* | (2009.01) |
| *H04W 64/00* | (2009.01) |
| *H04W 84/04* | (2009.01) |

(52) U.S. Cl.
CPC ........ *H04W 64/003* (2013.01); *H04W 84/042* (2013.01)

(58) Field of Classification Search
CPC ....... H04W 84/042; H04W 4/70; H04W 8/04; H04W 12/06; H04W 88/16; H04W 24/10; H04L 61/1511; H04L 12/2803; H04L 1/22; H04L 41/022; H04L 43/065; H04L 47/22; H04M 15/48; H04M 15/8033; H04M 15/8066; H04M 15/8072; H04M 15/8077; Y02D 70/1222; Y02D 70/1224; Y02D 70/1226; Y02D 70/1242; Y02D 70/1244; Y02D 70/1246
See application file for complete search history.

(56) References Cited

U.S. PATENT DOCUMENTS

| | | | |
|---|---|---|---|
| 8,023,482 B2 | 9/2011 | Gong et al. | |
| 9,781,259 B1 | 10/2017 | Kodaypak | |
| 9,948,646 B1* | 4/2018 | Lai .................... | H04L 63/0884 |
| 10,104,567 B2 | 10/2018 | Kodaypak | |
| 10,212,639 B2 | 2/2019 | Kodaypak | |
| 10,375,530 B2 | 8/2019 | Buckley et al. | |
| 10,517,138 B2 | 12/2019 | Starsinic et al. | |
| 10,536,211 B2 | 1/2020 | Leroux | |
| 10,542,459 B2 | 1/2020 | Hua et al. | |
| 10,548,000 B2 | 1/2020 | Jain et al. | |
| 10,548,062 B2 | 1/2020 | Cui et al. | |
| 10,555,202 B1 | 2/2020 | Narayanan et al. | |
| 10,575,278 B2 | 2/2020 | Kim et al. | |
| 10,581,623 B2 | 3/2020 | Lu et al. | |
| 10,588,085 B2 | 3/2020 | Kim et al. | |
| 10,595,268 B2 | 3/2020 | Lee et al. | |
| 10,601,932 B2 | 3/2020 | Kodaypak et al. | |
| 10,602,322 B2 | 3/2020 | Palanisamy et al. | |
| 10,602,441 B2 | 3/2020 | Palanisamy et al. | |
| 10,609,154 B2 | 3/2020 | Talebi Fard et al. | |
| 10,623,161 B2 | 4/2020 | Åström et al. | |
| 10,631,266 B2 | 4/2020 | Park et al. | |
| 10,652,085 B2 | 5/2020 | Ryu et al. | |
| 10,652,098 B2 | 5/2020 | Kim | |
| 10,742,744 B1 | 8/2020 | Mahalank et al. | |
| 10,778,527 B2 | 9/2020 | Assali et al. | |
| 2004/0203744 A1* | 10/2004 | Hicks .................... | H04W 48/16 455/432.1 |
| 2008/0039132 A1* | 2/2008 | Delibie ................ | H04W 88/06 455/552.1 |
| 2010/0029301 A1* | 2/2010 | Pyo ..................... | H04W 64/003 455/456.5 |
| 2010/0118847 A1* | 5/2010 | Lee ...................... | H04W 48/08 370/338 |
| 2012/0320766 A1* | 12/2012 | Sridhar ................ | H04W 24/02 370/252 |
| 2014/0189151 A1* | 7/2014 | Aviv ................... | H04L 67/1004 709/233 |
| 2015/0016266 A1 | 1/2015 | Dumitrescu et al. | |
| 2015/0110000 A1 | 4/2015 | Zhang et al. | |
| 2015/0263987 A1 | 9/2015 | Klein et al. | |
| 2016/0164788 A1 | 6/2016 | Goel et al. | |
| 2016/0315743 A1 | 10/2016 | Nagaraj et al. | |
| 2016/0373591 A1 | 12/2016 | Sharma et al. | |
| 2017/0195822 A1 | 7/2017 | Watfa et al. | |
| 2017/0244629 A1* | 8/2017 | Kodaypak ............... | H04W 4/70 |
| 2017/0347283 A1 | 11/2017 | Kodaypak | |
| 2018/0035351 A1 | 2/2018 | Kodaypak | |
| 2018/0249281 A1 | 8/2018 | McCann | |
| 2018/0263013 A1* | 9/2018 | Jain ........................ | H04W 8/06 |
| 2018/0324671 A1 | 11/2018 | Palnati et al. | |
| 2018/0376417 A1 | 12/2018 | Wang | |
| 2019/0007329 A1 | 1/2019 | Velev et al. | |
| 2019/0141527 A1* | 5/2019 | Krishan .................. | H04W 4/70 |
| 2019/0191274 A1 | 6/2019 | Fontaine | |
| 2019/0306251 A1 | 10/2019 | Talebi Fard et al. | |
| 2019/0349426 A1 | 11/2019 | Smith et al. | |
| 2020/0021953 A1 | 1/2020 | Mahalank | |
| 2020/0028973 A1 | 1/2020 | Livanos et al. | |
| 2020/0037203 A1 | 1/2020 | Ianev et al. | |
| 2020/0037226 A1 | 1/2020 | Magadevan | |
| 2020/0053628 A1 | 2/2020 | Wang et al. | |
| 2020/0053686 A1 | 2/2020 | Edge et al. | |
| 2020/0053802 A1 | 2/2020 | Li et al. | |
| 2020/0059927 A1 | 2/2020 | Sun et al. | |
| 2020/0068047 A1 | 2/2020 | Huang et al. | |
| 2020/0068626 A1 | 2/2020 | Cakulev et al. | |
| 2020/0077253 A1 | 3/2020 | Kim et al. | |
| 2020/0077361 A1 | 3/2020 | Huang et al. | |
| 2020/0084277 A1 | 3/2020 | Somaraju | |
| 2020/0092706 A1 | 3/2020 | Kawasaki et al. | |
| 2020/0100080 A1* | 3/2020 | Mladin .................. | H04W 4/50 |
| 2020/0100088 A1 | 3/2020 | Kim et al. | |
| 2020/0100291 A1 | 3/2020 | Ravishankar et al. | |
| 2020/0106695 A1 | 4/2020 | Rk et al. | |
| 2020/0120475 A1 | 4/2020 | Gupta | |
| 2020/0120478 A1 | 4/2020 | Kim | |
| 2020/0128566 A1 | 4/2020 | Wei et al. | |
| 2020/0137675 A1 | 4/2020 | Park et al. | |
| 2020/0145309 A1 | 5/2020 | Soderlund | |
| 2020/0146077 A1 | 5/2020 | Li et al. | |
| 2020/0322884 A1* | 10/2020 | Di Girolamo .......... | H04W 8/20 |

FOREIGN PATENT DOCUMENTS

| | | |
|---|---|---|
| WO | WO 2020/171899 A1 | 8/2020 |
| WO | WO 2020/210026 A1 | 10/2020 |

OTHER PUBLICATIONS

"3rd Generation Partnership Project; Technical Specification Group Radio Access Network; Evolved Universal Terrestrial Radio Access Network (E-UTRAN); S1 Application Protocol (S1AP) (Release 15)," 3GPP TS 36.413, V15.4.0, pp. 1-383 (Dec. 2018).
"3rd Generation Partnership Project; Technical Specification Group Core Network and Terminals; Mobility Management Entity (MME) and Serving GPRS Support Node (SGSN) interfaces for interworking with packet data networks and applications (Release 15)," 3GPP TS 29.128, V15.4.0, pp. 1-52 (Dec. 2018).
"3rd Generation Partnership Project; Technical Specification Group Core Network and Terminals; T8 reference point for Northbound APIs; (Release 15)," 3GPP TS 29.122, V15.2.0, pp. 1-297 (Dec. 2018).
"Diameter Signaling Router SCEF User's Guide," Release 8.3, E93572, Oracle® Communications, pp. 1-110 (Sep. 2018).
"3rd Generation Partnership Prject; Technical Specification Group Services and System Aspects; Universal Geographical Area Description (GAD) (Release 15)," 3GPP TS 23.032, pp. 1-32 (Sep. 2018).
"3rd Generation Partnership Project; Technical Specification Group Services and System Aspects; Architecture enhancements to facilitate communications with packet data networks and applications (Release 15)," 3GPP TS 23.682, V15.2.0, pp. 1-122 (Sep. 2017).
Mayer, Georg (Huawei) "3GPP 5G CoreNetwork Status", 3GPP A Global Initiative, pp. 1-23 (Nov. 2017).
Notice of Allowance and Fee(s) Due for U.S. Appl. No. 16/280,672 (dated Sep. 25, 2019).

(56) References Cited

OTHER PUBLICATIONS

Commonly-assigned, co-pending U.S. Appl. No. 16/415,758 for "Methods, Systems, and Computer Readable Media for Providing Reduced Signaling Internet of Things (IoT) Devnce Monitoring," (Unpublished, filed May 17, 2019).

Commonly-assigned, co-pending U.S. Appl. No. 16/399,428 for "Methods, Systems, and Computer Readable Media for Monitoring Lightweight Machine to Machine (LWM2M) Internet of Things (IoT) Devices Through Service Capability Exposure Function (SCEF) T8 Interface," (Unpublished, filed Apr. 30, 2019).

"3rd Generation Partnership Project; Technical Specification Group Core Network and Terminals; Home Subscriber Server (HSS) diameter interfaces for interworking with packet data networks and applications (Release 15)," 3GPP TS 29.336,V15.6.0, pp. 1-79 (Mar. 2019).

"3rd Generation Partnership Project; Technical Specification Group Core Network and Terminals; Evolved Packet System (EPS); Mobility Management Entity (MME) and Serving GPRS Support Node (SGSN) related interfaces based on Diameter protocol (Release 15)," 3GPP TS 29.272, V15.7.0, pp. 1-179 (Mar. 2019).

"3rd Generation Partnership Project; Technical Specification Group Services and System Aspects; Architecture enhancements to facilitate communications with packet data networks and applications (Release 16)," 3GPP TS 23.682, V16.2.0, pp. 1-126 (Mar. 2019).

"3rd Generation Partnership Project; Technical Specification Group Core Network and Terminals; T8 reference point for Northbound APIs; (Release 16)," 3GPP TS 29.122, V16.1.0, pp. 1-288 (Mar. 2019).

"OMA Lightweight Machine to Machine Requirements," Candidate Version 1.2, Open Mobile Alliance, pp. 1-20 (Jan. 24, 2019).

"3rd Generation Partnership Project; Technical Specification Group Services and System Aspects; Architecture enhancements to facilitate communications with packet data networks and applications (Release 16)," 3GPP TS 23.682, V16.1.0, pp. 1-126 (Dec. 2018).

"3rd Generation Partnership Project; Technical Specification Group Core Network and Terminals; Home Subscriber Server (HSS) diameter interfaces for interworking with packet data networks and applications (Release 15)," 3GPP TS 29.336, V15.5.0, pp. 1-74 (Dec. 2018).

"3rd Generation Partnership Project; Technical Specification Group Core Network and Terminals; Mobile Application Part (MAP) specification (Release 15)," 3GPP TS 29.002, V15.4.0, pp. 1-1021 (Dec. 2018).

"3rd Generation Partnership Project; Technical Specification Group Core Network and Terminals; Customised Applications for Mobile network Enhances Logice (CAMEL) Phase 4; Stage 2 (Release 15)," 3GPP TS 23.078, V15.0.0, pp. 1-750 (Jun. 2018).

"Lightweight Machine to Machine Technical Specification: Transport Bindings," Candidate Version: 1.1, Open Mobile Alliance, pp. 1-67 (Jun. 12, 2018).

"Lightweight Machine to Machine Technical Specification: Core," Candidate Version: 1.1, Open Mobile Alliance, pp. 1-142 (Jun. 12, 2018).

Bormann et al., "Block-Wise Transfers in the Constrained Application Protocol (CoAP)," RFC 7959, pp. 1-37 (Aug. 2016).

Hartke, "Observing Resources in the Constrained Application Protocol (CoAP)," RFC 7641, pp. 1-30 (Sep. 2015).

Shelby et al., "The Constrained Application Protocol (CoAP)," RFC 7252, pp. 1-112 (Jun. 2014).

Notification of Transmittal of the International Search Report and the Written Opinion of the International Searching Authority, or the Declaration for International Application Serial No. PCT/US2020/024518 (dated Jul. 10, 2020).

"Lightweight Machine to Machine Technical Specification: Transport Bindings," Approved Version: 1.1, Open Mobile Alliance, pp. 1-68 (Aug. 6, 2018).

Non-Final Office Action for U.S. Appl. No. 16/415,758 (dated May 26, 2020).

Notification of Transmittal of the International Search Report and the Written Opinion of the International Searching Authority, or the Declaration for International Application Serial No. PCT/US2020/013960 (dated Apr. 20, 2020).

Notice of Alliwance and Fee(s) Due for U.S. Appl. No. 16/399,428 (dated Apr. 6, 2020).

Notification of Transmittal of the International Search Report and the Written Opinion of the International Searching Authority, or the Declaration for International Application Serial No. PCT/US2020/013961 (dated Mar. 31, 2020).

"Universal Mobile Telecommunications System (UMTS); LTE; Tsp interface protocol between the MTC Interworking Function (MTC-IWF) and Service Capability Server (SCS)," 3GPP TS 29.368, V15.0.0, pp. 1-35 (Jul. 2018).

"3rd Generation Partnership Project; Technical Specification Group Radio Access Network; Evolved Universal Terrestrial Radio Access Network (E-UTRAN); S1 signalling transport (Release 15)," 3GPP TS 36.412, V15.0.0, pp. 1-8 (Jun. 2018).

Hoglund et al., "Overview of 3GPP Release 14 Enhanced NB-IoT," in IEEE Network, vol. 31, No. 6, pp. 16-22 (Nov./Dec. 2017).

Kafle et al., "Scalable Directory Service for IoT Applications," in IEEE Communications Standards Magazine, vol. 1, No. 3, pp. 58-65 (Sep. 2017).

Kouzayha et al., "Measurement-Based Signaling Management Strategies for Cellular IoT," in IEEE Internet of Things Journal, vol. 4, No. 5, pp. 1434-1444 (Oct. 2017).

Yu, "The Mobile Network Capability Exposure Friendly to the Mobile Internet Applications," 2017 IEEE Wireless Communications and Networking Conference (WCNC), pp. 1-6 (2017).

"3rd Generation Partnership Project; Technical Specification Group Services and System Aspects; Architecture enhancements to facilitate communications with packet data networks and applications (Release 13)," 3GPP TS 23.682, V13.6.0, pp. 1-91 (Jun. 2016).

"3rd Generation Partnership Project; Technical Specification Group Services and System Aspects; Architecture enhancements to facilitate communications with packet data networks and applications (Release 13)," 3GPP TS 23.682, V13.4.0, pp. 1-81 (Dec. 2015).

ZTE, "Reporting the Number of UEs in Certain Geographic Area," SA WG2 Meeting #107, pp. 1-4 (Jan. 30, 2015).

Ratasuk et al., "Overview of LTE Enhancements for Cellular IoT," 2015 IEEE 26th International Symposium on Personal, Indoor and Mobile Radio Communications—(PIMRC): Workshop on M2M Communications: Challenges, Solutions, and Applications, pp. 1-5 (2015).

Hawilo et al., "NFV: State of the Art, Challenges, and Implementation in Next Generation Mobile Networks (vEPC)," IEEE Network, pp. 1-9 (Nov./Dec. 2014).

Abdullah et al., "Femtocell Geo-location Challenge: DSL Approach as Solution," 2014 IEEE 5th Control and System Graduate Research Colloquium, pp. 239-241 (Aug. 11, 2014).

China Mobile, "Supporting legacy HLR in Architecture for MTC usage," SA WG2 Meeting #90, pp. 1-9 (Apr. 10, 2012).

Le et al., "Cross-Layer Mobility Management based on Mobile IP and SIP in IMS," 2007 International Conference on Wireless Communications, Networking and Mobile Computing, pp. 803-806 (2007).

Bertrand, "The IP Multimedia Subsystem in Next Generation Networks" Network, Multimedia and Security Department (RSM), pp. 1-9 (May 30, 2007).

Faccin et al., "IP multimedia services: analysis of mobile IP and SIP interactions in 3G networks," in IEEE Communications Magazine, vol. 42, No. 1, pp. 113-120 (Jan. 2004).

Applicant-Initiated Interview Summary for U.S. Appl. No. 16/415,758 (dated Oct. 20, 2020).

\* cited by examiner

METHODS, SYSTEMS, AND COMPUTER READABLE MEDIA FOR DYNAMICALLY PROVISIONING AND USING PUBLIC LAND MOBILE NETWORK (PLMN) LOCATION MAPPINGS IN SERVICE CAPABILITY EXPOSURE FUNCTION (SCEF) OR NETWORK EXPOSURE FUNCTION (NEF)

TECHNICAL FIELD

The subject matter described herein relates to provisioning and using PLMN location mappings in a database. More particularly, the subject matter described herein relates to dynamically provisioning a PLMN location mapping database and using the mappings to respond to monitoring request messages from Internet of things (IoT) application servers (ASs) and service capability servers (SCSs).

BACKGROUND

The Third Generation Partnership Project (3GPP) defines machine type communication (MTC) monitoring procedures that allow IoT ASs and SCSs to monitor IoT devices. The interface used by ASs and SCSs to monitor IoT devices is referred to as the T8 interface or reference point and is provided in 4G networks by the SCEF. In 5G networks, the NEF provides the interface for IoT ASs and SCSs to obtain information regarding IoT devices.

One type of monitoring that is performed via the T8 interface is monitoring to determine the number of IoT devices located in a geographic area. Such monitoring might be useful, for example, to determine the number of IoT devices or UEs present in fleet motor vehicles in a geographic area. In another example, IoT devices may be attached to or worn by cattle and may be used to track movements of cattle within a geographic area. In a security application, IoT devices may be worn or carried by security personnel, and it may be desirable to know the number of security personal present in a given geographic area.

To perform this type of monitoring, a user may send a request to an SCS or AS. The request from the user may identify the geographic area for which monitoring is requested using a common name, address, or geographic coordinates. The SCS or AS sends a monitoring request message to the SCEF or NEF. Because SCSs and ASs are external to the PLMN in which the IoT devices are operating, the SCSs and ASs might not know PLMN location information (e.g., cell ID, evolved nodeB (eNB) ID, etc.) where the IoT devices are located. As a result, the monitoring request message may simply include a geographic identifier (e.g., the name of a place or region).

The SCEF or NEF receives the monitoring request message and must determine which PLMN nodes to contact to obtain the counts of UEs within the geographic area identified in the monitoring request message. To identify the PLMN nodes to contact, the SCEF or NEF must store or have access to mappings between geographic identifiers and PLMN location information for PLMN nodes that serve UEs within the geographic area.

Currently, there is no mechanism specified for automatically provisioning a database of PLMN location mappings in the SCEF or NEF for responding to these types and other types of monitoring request messages. Accordingly, there exists a long felt need for methods, systems, and computer readable media for dynamically provisioning and using PLMN location mappings in an SCEF or NEF.

SUMMARY

A method for dynamically provisioning and using public land mobile network (PLMN) location mappings includes, in a service capability exposure function (SCEF) or a network exposure function (NEF) implemented using at least one processor, receiving, from a PLMN network node, a message containing a PLMN location identifier and a non-PLMN location identifier, extracting the PLMN location identifier and the non-PLMN location identifier from the message, and storing, in a PLMN location mapping database in the SCEF or NEF, a mapping between the PLMN location identifier and the non-PLMN location identifier. The method further includes receiving, via a monitoring interface of the SCEF or NEF, a monitoring request message requesting Internet of things (IoT) device information and including a non-PLMN location identifier, locating an entry in the PLMN location mapping database corresponding to the non-PLMN location identifier and extracting a PLMN location identifier from the database, using the PLMN location identifier extracted from the database to obtain IoT device information, and responding to the monitoring request message with the IoT device information.

According to another aspect of the subject matter described herein, receiving, from a PLMN network node, a message containing a non-PLMN location identifier and a PLMN location identifier includes receiving a Diameter connection management request (CMR) or a connection update request.

According to yet another aspect of the subject matter described herein, receiving the CMR from a PLMN network node includes receiving the CMR from a mobility management entity (MME) in response to a setup request or a configuration update message, respectively, from an evolved node B (eNB).

According to yet another aspect of the subject matter described herein, the non-PLMN location identifier contained in the CMR or the connection update request includes geographic coordinates of an area corresponding to the eNB and the PLMN location identifier in the CMR comprises an eNB identifier.

According to yet another aspect of the subject matter described herein, the PLMN location identifier contained in the CMR or the connection update request comprises at least one of a cell ID, a tracking area (TA), and a routing area (RA) corresponding to the geographic coordinates.

According to yet another aspect of the subject matter described herein, receiving, from a PLMN network node, a message containing a PLMN location identifier and a non-PLMN location identifier includes receiving the message from a self-organizing network (SON) system used to configure evolved node Bs.

According to yet another aspect of the subject matter described herein, the SCEF or NEF adds or updates PLMN location to non-PLMN location mappings to the PLMN location mapping database when an evolved node B (eNB) connects or reconnects to the PLMN and sends a setup request message to a mobility management node.

According to yet another aspect of the subject matter described herein, the monitoring request message is a request for a count of the number of user equipment (UEs) in a geographic area specified by the non-PLMN location identifier, and the SCEF uses the mapping between the non-PLMN location identifier and the PLMN location identifier to contact mobility management entities (MMEs) and obtain a count of UEs in the geographic area.

According to yet another aspect of the subject matter described herein, the extracting and storing are preformed automatically by the SCEF or NEF in response to receiving the message from the PLMN network node.

A system for dynamically provisioning and using public land mobile network (PLMN) location mappings includes a service capability exposure function (SCEF) or a network exposure function (NEF) implemented using at least one processor. The SCEF or NEF further includes a public land mobile network (PLMN) location mapping database for storing mappings between PLMN location identifiers and non-PLMN location identifiers. The SCEF or NEF further includes a PLMN-facing interface for receiving, from a PLMN network node, a message containing a PLMN location identifier and non-PLMN location information. The SCEF or NEF further includes a dynamic PLMN location mapping database provisioning module for extracting the PLMN location identifier and the non-PLMN location identifier from the message and storing, in the PLMN location mapping database, a mapping between the PLMN location identifier and the non-PLMN location identifier. The SCEF or NEF further includes a monitoring interface for receiving, from an application server (AS) or a service capability server (SCS), a monitoring request message requesting Internet of things (IoT) device information and including a non-PLMN location identifier, locating an entry in the PLMN location mapping database corresponding to the non-PLMN location identifier, extracting a PLMN location identifier from the database, using the PLMN location identifier extracted from the database to obtain the IoT device information, and responding to the monitoring request message with the IoT device information.

According to another aspect of the subject matter described herein, the dynamic PLMN location mapping database provisioning module is configured to associate a serving mobility management entity (MME) or access and mobility management function (AMF) identity with the mapping.

According to another aspect of the subject matter described herein a non-transitory computer readable medium having stored thereon executable instructions that when executed by a processor of a computer controls the computer to perform steps. The steps are performed in a service capability exposure function (SCEF) or a network exposure function (NEF) implemented using at least one processor. The steps include receiving, from a PLMN network node, a message containing a PLMN location identifier and a non-PLMN location identifier. The steps further include extracting the PLMN location identifier and the non-PLMN location identifier from the message and storing, in a PLMN location mapping database in the SCEF or NEF, a mapping between the PLMN location identifier and the non-PLMN location identifier. The steps further include receiving, via a monitoring interface of the SCEF or NEF, a monitoring request message requesting Internet of things (IoT) device information and including a non-PLMN location identifier. The steps further include locating an entry in the PLMN location mapping database corresponding to the non-PLMN location identifier and extracting a PLMN location identifier from the database. The steps further include using the PLMN location identifier extracted from the database to obtain IoT device information. The steps further include responding to the monitoring request message with the IoT device information.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

The subject matter described herein will now be explained with reference to the accompanying drawings of which.

DETAILED DESCRIPTION

Figure 1:
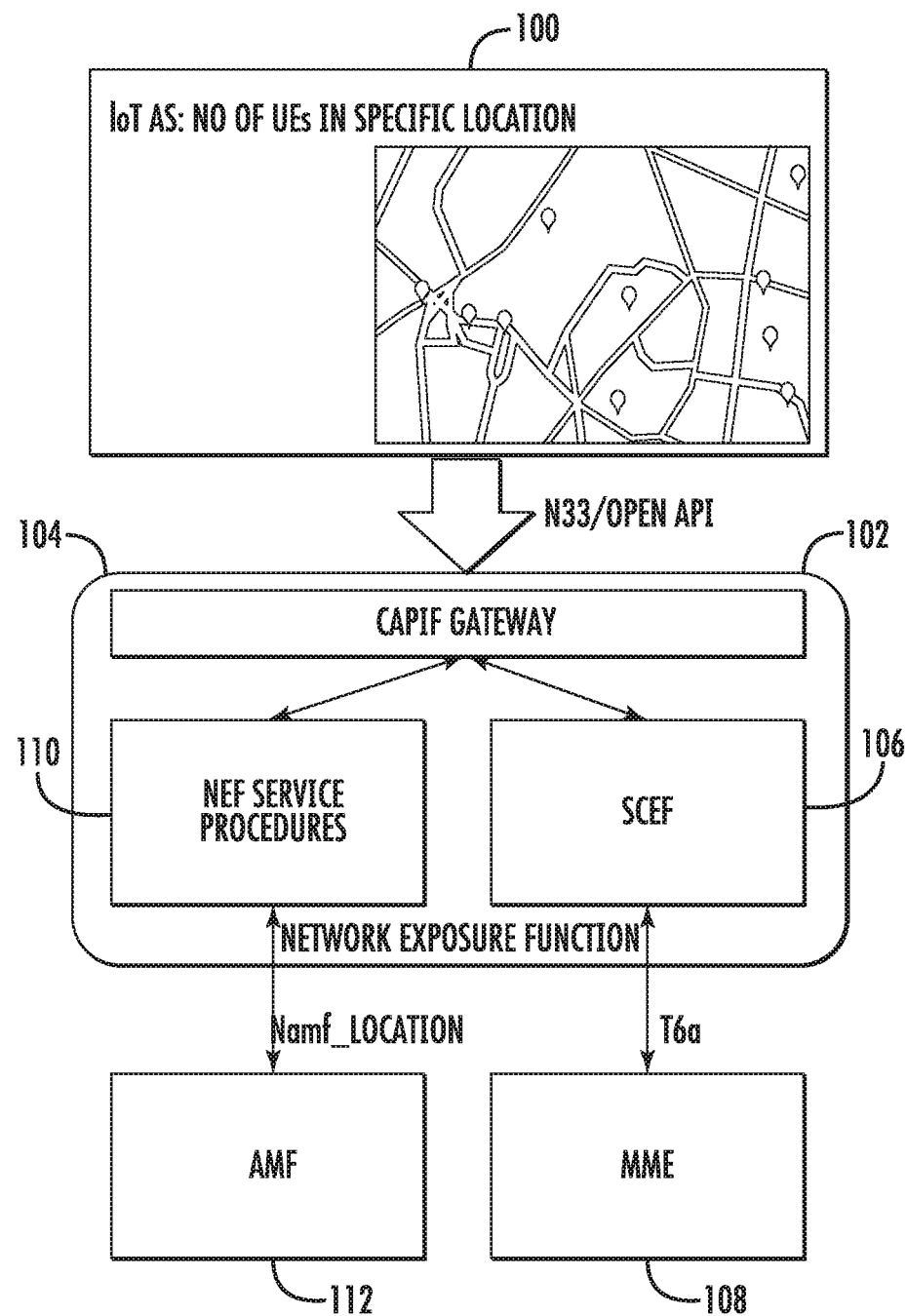
FIG. 1 is a block diagram illustrating an exemplary IoT use case scenario for an SCEF or NEF with a PLMN location mapping database.

The subject matter described herein includes an SCEF or NEF that includes a dynamically provisioned PLMN location mapping database. Such a database can be used to respond to monitoring requests from SCSs and ASs where the monitoring requests include non-PLMN location identifiers, such as geographic coordinates, geographic place names, etc. FIG. 1 is a block diagram illustrating an exemplary use case for the SCEF or NEF with a dynamically provisioned PLMN location mapping database. In FIG. 1, an IoT application server 100 sends a monitoring request message to a network exposure function (NEF) 102. The monitoring request message may include non-PLMN location identifiers, such as city or state identifiers, geographic coordinates (including GPS coordinates and longitude and latitude), region identifiers, street addresses, etc. NEF 102 includes a common application programming interface (API) framework (CAPIF) gateway 104, an SCEF 106, and an NEF service procedures module 110. CAPIF gateway 104 provides a common API for devices to access network functions. CAPIF gateway 104 is not essential in explaining the subject matter described herein, but is included in FIG. 1 for completeness. IoT AS 100 may communicate with CAP IF gateway 104 via the 3GPP messaging specified for the N33 interface or using an open API.

On the side of CAPIF gateway 104, SCEF 106 includes the above-referenced T8 interface for receiving monitoring requests regarding 4G IoT devices. SCEF 106, on the PLMN-facing side, communicates with PLMN network nodes, such as mobility management entity (MME) 108, to obtain information about IoT devices. The interface between SCEF 106 and MME 108 is referred to as the T6a interface.

For 5G (and possibly subsequent generation) IoT devices, an NEF services procedures module 110 receives monitoring requests from application servers and service capability servers. On the PLMN-facing side, NEF service procedures module 110 may communicate with an access and mobility management function (AMF) 112 via an interface referred to as the Namf interface. MME 108 performs mobility and registration management procedures for 4G UEs, such as 4G IoT devices. AMF 112 performs mobility and registration management procedures for 5G UEs, such as 5G IoT devices.

Continuing with the location monitoring request example, IoT application server 100 sends send the monitoring request to NEF 102. CAPIF gateway 104 may forward monitoring request to SCEF 106 or NEF service procedures module 110, depending on whether the request if for 4G or 5G IoT device information. SCEF 106 or NEF service procedures module 110 accesses internal mappings between the geographic identifiers in the request message to PLMN identifiers to determine the identities of the MMEs and/or AMFs to contact to obtain the requested location information.

As described above, there is no defined procedure for automatically provisioning PLMN location mappings in the SCEF or NEF. As a result, such location mappings may be manually provisioned. Manually provisioning location mappings in the SCEF or NEF is undesirable in light of the large numbers of eNBs that may be present in a PLMN.

One the PLMN location mapping is obtained, SCEF 106 and/or NEF services procedures module 110 contacts MME 108 and/or AMF 112. MME 108 and AMF 112 provide the requested location information to SCEF 106 and NEF service procedures module 110. SCEF 106 and NEF service procedures module 110 provide the requested location information to IoT application server 100. In this example, the location information is the count of UEs occupying a particular geographic area. The count can be the number of UEs that the system knows in its normal operation to be within the geographical area. In 3GPP specifications, this is referred to as the last known location of the UE. The count can also be the number of UEs currently in the geographic area. In 3GPP specifications, this is referred to as the current location.

Figure 2:
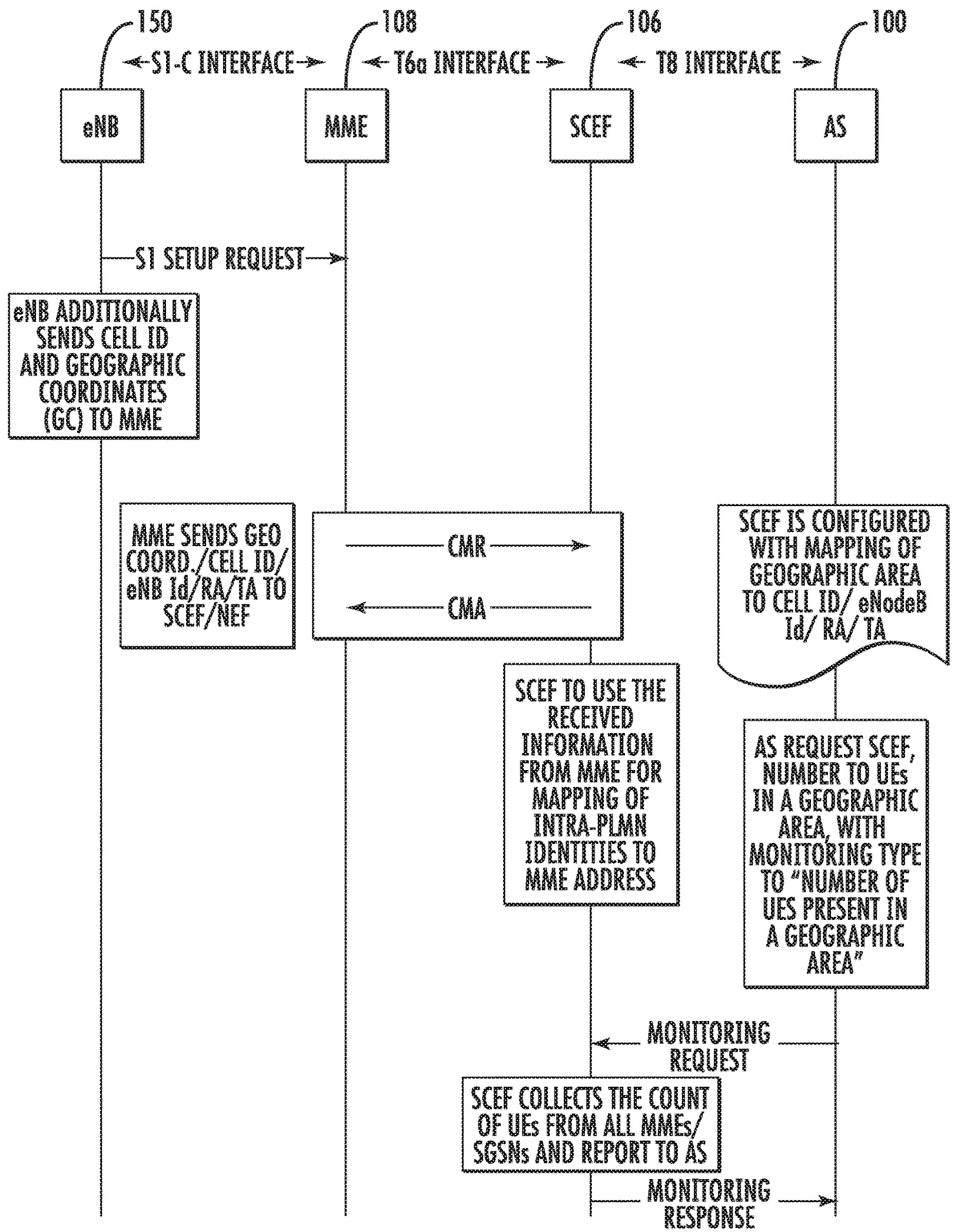
FIG. 2 is a message flow diagram illustrating exemplary messaging exchanged for dynamically provisioning a PLMN location mapping database in an SCEF or NEF and using the dynamically provisioned PLMN location mapping database to respond to a monitoring request.

As stated above, manually provisioning the location mappings at the SCEF or the NEF is labor intensive and prone to error. Accordingly, the subject matter described herein and includes a method for dynamically configuring a PLMN location database at the SCEF or NEF. FIG. 2 is a message flow diagram illustrating exemplary messaging for dynamically configuring PLMN location mapping database in the SCEF or NEF. The message flow in FIG. 2 is for automatically provisioning the PLMN location mapping database in the SCEF and uses 4G message examples. It is understood that similar messaging could be used to automatically provision a PLMN location mapping database at an NEF for 5G network elements.

Referring to FIG. 2, rather than manually provisioning the PLMN location mapping database, the SCEF automatically provisions the database using location mappings obtained from messaging that is transmitted from the MME when an evolved node B (eNB) attaches to the network or reconnects to the network. In the illustrated example, SCEF 106 is connected to MME 108 via the T6a interface. It is this interface over which SCEF 106 receives PLMN location mapping information. MME 108 is connected to eNB 150 via the S1-C interface. When eNB 150 attaches to the network, eNB 150 provides location mapping information to MME 108, and MME 108 provides the location mapping information to SCEF 106. The specific messaging and parameters used will now be described.

In the message flow diagram illustrated in FIG. 2, in the first line, eNB 150 sends an S1 setup request to MME 108 over the S1-C interface. The S1 setup request is sent when eNB 150 attaches to or reconnects with the network. The S1 setup request message includes new information elements (IEs) not specified by current 3GPP specifications for the S1 setup request message. These information elements will include non-PLMN location information, such as geographic coordinates of eNB 150. The geographic coordinates may include latitude and longitude or GPS coordinates. The S1 setup request message may also include PLMN location information, such as the cell ID of the cell in which eNB 150 operates.

Once MME 108 receives the S1 setup message with the PLMN and non-PLMN location information, MME 108 will send a Diameter connection management request (CMR) message to SCEF 106. The CMR message will include the eNB ID as well as supported transaction areas (TAs) as defined in 3GPP TS 36.413, version 15.4.0 (2018-12), the disclosure of which is incorporated herein by reference in its entirety. The format for the CMR message, according to 3GPP TS 29.128 version 15.4.0 (2018-12), the disclosure of which is incorporated herein by reference in its entirety, is as follows:

<Connection-Management-Request>::=<Diameter Header: 8388732, PXY, 16777346>
<Session-Id>
<User-Identifier>
<Bearer-Identifier>
[DRMP]
{Auth-Session-State}
{Origin-Host}
{Origin-Realm}
[Destination-Host]
{Destination-Realm}
[OC-Supported-Features]
[CMR-Flags]
[Maximum-UE-Availability-Time]
*[Supported-Features]
[Connection-Action]
[Service-Selection]
[Serving-PLMN-Rate-Control]

[Extended-PCO]
[3GPP-Charging-Characteristics]
[RAT-Type]
[Terminal-Information]
[Visited-PLMN-Id]
*[Failed-AVP]
*[Proxy-Info]
*[Route-Record]
*[AVP]

In addition to the above-listed attribute value pairs (AVPs), the CMR message will include new AVPs to carry the PLMN location information, such as the geographic coordinates (latitude and longitude). Another new AVP that may be be carried in the CMR message is the cell ID as described in 3GPP TS 36.413. Additional AVPs that may be carried included the eNB ID, TA, RA, etc. The serving MME or SGSN information may be obtained from the origin host AVP of the CMR message or it may be carried in a separate AVP.

Once SCEF 106 receives the CMR message, SCEF 106 adds the mapping between the PLMN location information and the non-PLMN location information to the PLMN location mapping database. The mapping information that is added to the database may include the geographic coordinates, the cell ID, eNB ID, routing areas (RAs), and tracking areas (TAs). SCEF 106 may also associate these parameters with the MME or SGSN address of the MME or SGSN that sent the CMR message. Accordingly, a PLMN location mapping database record or entry created after receiving the CMR message may include the following:

TABLE 1

Example PLMN Location Mapping Database Record

| Geographic Coordinates | Cell ID | eNB ID | Routing Area (RA) | Tracking Area (TA) | Serving MME or SGSN Address |
|---|---|---|---|---|---|
| 35.779591, −78.638176 | 268435455 | FFFF | 1234 | 5678 | 192.168.0.1 |

In the example PLMN location mapping database record illustrated in Table 1, the record is indexed by geographic coordinates, which in the illustrated example is longitude and latitude. The next parameter is the cell ID as specified in 3GPP TS 36.413. The next parameter is the eNB identifier, which is the leftmost 20 bits of the cell ID. The next two parameters are routing area and tracking area, which are used to identify the location of the UE for different types of services. The next parameter is the MME or SGSN address, which in the illustrated example is an IP address.

SCEF 106 also responds to the CMR message with a Diameter connection management answer (CMA) message and transmits the CMA message to MME 108 over the T6a interface.

Once SCEF 106 is provisioned with the location mapping information, SCEF 106 can respond to monitoring request messages from AS 100. In the example illustrated in FIG. 2, AS 100 sends a monitoring request message to SCEF 106. The monitoring request message is a request for the number of UEs present in a geographic area. The monitoring request message may include a non-PLMN location parameter identifying the area for which AS 100 wishes to inquire about the number of UEs. The monitoring request message may include a monitoring event type parameter that indicates that the request is a request for the number of UEs present in the geographic area. In response to receiving the monitoring request message, SCEF 106 accesses the PLMN location mapping database using either the non-PLMN location identifier in the monitoring request message or a non-PLMN location identifier derived from the non-PLMN location identifier in the request message. For example, if the monitoring request message includes geographic coordinates, then the geographic coordinates may be used to access the PLMN location mapping database. If the monitoring request message includes a place name, the place name may be mapped to geographic coordinates, and the geographic coordinates may be used to access the database.

SCEF 106 contacts the MMEs and SGSNs corresponding to the geographic location information received in the monitoring event request message. The MMEs and SGSNs each report the number of UEs served by the eNBs or other access devices in their respective areas to SCEF 106. SCEF 106 totals the number of UEs and reports the number of UEs to AS 100 in a monitoring event response message.

Figure 3:
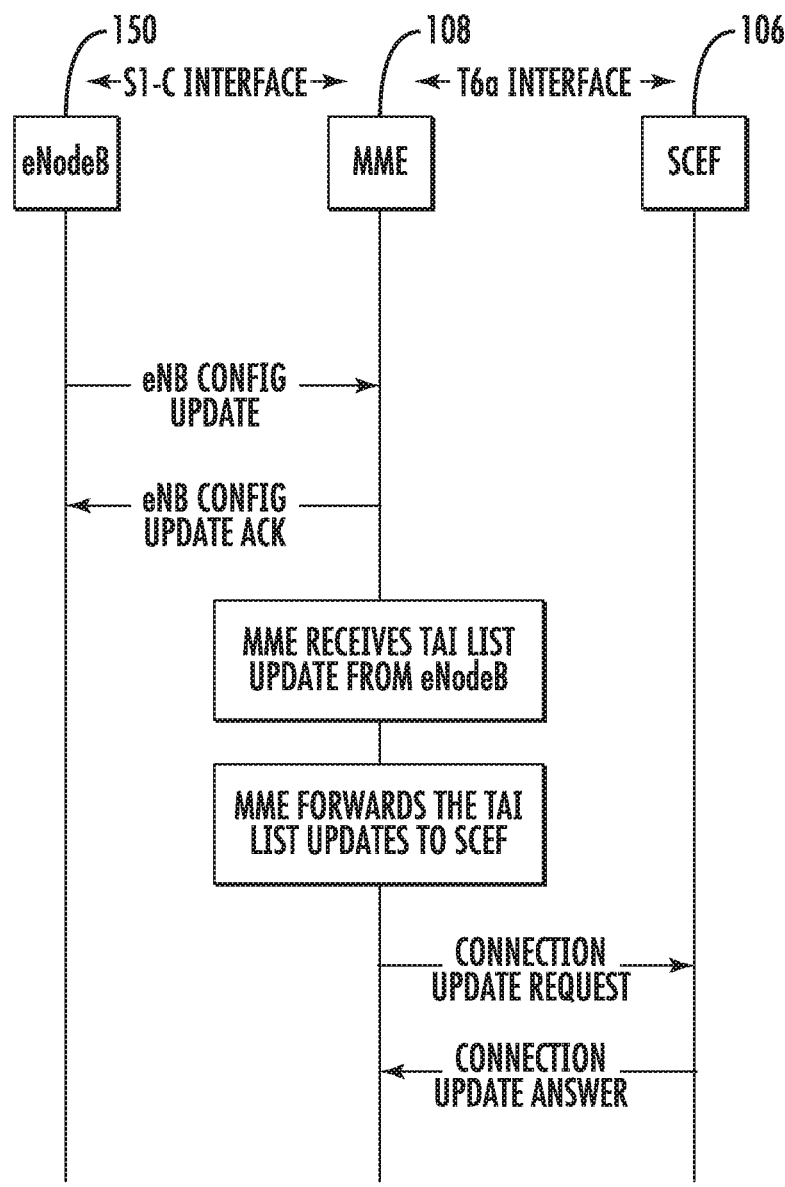
FIG. 3 is a message flow diagram illustrating exemplary messaging exchanged for dynamically updating a PLMN location mapping database in an SCEF or NEF.

FIG. 3 is a message flow diagram illustrating exemplary messaging exchanged for dynamically updating a PLMN location mapping database in an SCEF or NEF when an eNB has a configuration update to send to an MME. Referring to the message flow in FIG. 3, eNB 150 utilizes an existing configuration update message to MME 108 to communicate PLMN location updates to MME 108. When eNB 150 has a configuration update to send to eNB 150, eNB 150 sends a configuration update message to MME 108. The configuration update message may include updated PLMN location information, such as updated tracking area identity (TAI) list updates. MME 108 responds to the configuration update with a corresponding answer message MME 108 sends the TAI list updates to SCEF 106. SCEF 106 may use the TAI list updates to update PLMN location mapping data. SCEF 106 responds to the update request message with a corresponding answer message. In addition, MME 108 sends the TAI list updates to SCEF 106 when a new eNB is provisioned in the network and connects to MME 108.

In an alternate implementation, rather than using messaging from the MME to carry information used to dynamically provision the PLMN location mapping database at the SCEF or NEF, the SCEF or NEF may be provided with a SON interface through which the SCEF or NEF communicates with a SON system to receive location information for dynamically provisioning the PLMN location mapping database. A SON system is used by network operators to manage eNB nodes. Accordingly, the SON system will be or may be provisioned to be aware of PLMN and non-PLMN location information associated with the eNB nodes.

Figure 4:
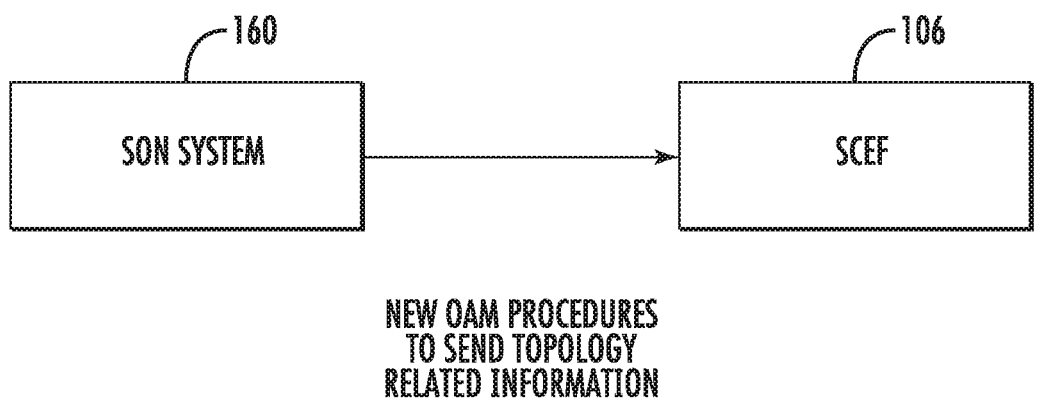
FIG. 4 is a block diagram illustrating dynamically updating a PLMN location mapping database in an SCEF or NEF using a self-organizing network (SON) operations administration and maintenance (OAM) node.

FIG. 4 is a block diagram illustrating dynamically updating a PLMN location mapping database in an SCEF or NEF using a SON system. In FIG. 4, a SON system 160 may receive and store configuration information, including eNB ID, cell ID, TA, RA, and geographic coordinates for the eNBs that SON system 160 manages. SON system 160 may communicate this information to SCEF 106, using new operations, administration, and maintenance (OAM) procedures implemented between SON system 160 and SCEF 106. These procedures may include sending a configuration update message including the PLMN and non-PLMN location information from SON system 160 to SCEF 106 when an eNB connects to the network for the first time or reconnects to the network after being disconnected. SCEF 106 may use the information to update the mappings in the PLMN location mapping database. SCEF 106 may acknowledge receipt of the configuration update message from SON system 160 sending an answer or acknowledgement message to SON system 160.

Figure 5:
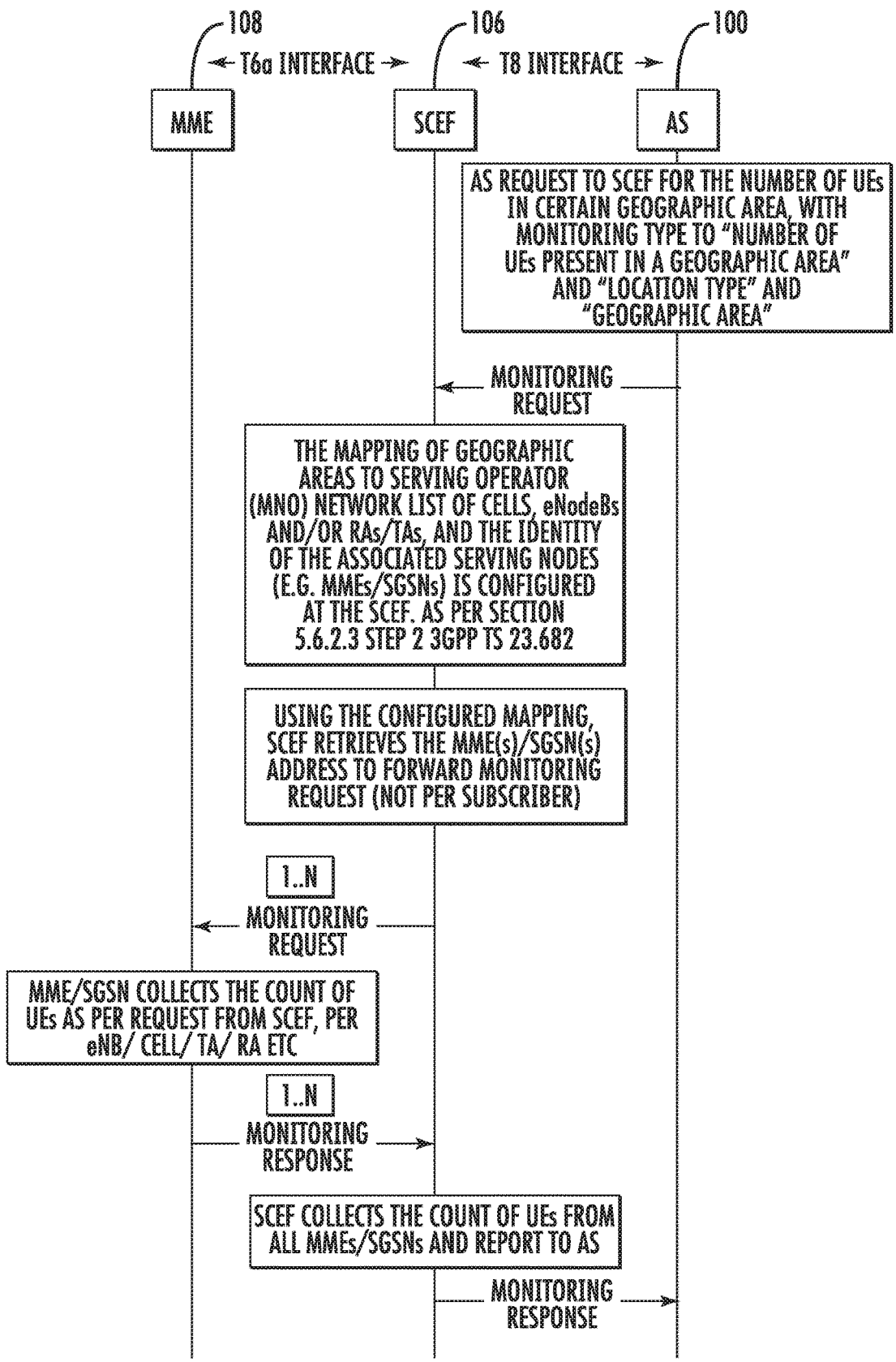
FIG. 5 is a message flow diagram illustrating exemplary messaging exchanged for responding to a monitoring request using dynamically provisioned PLMN location mappings in an SCEF or NEF.

As stated above, one use case for the dynamically provisioned PLMN location information at the SCEF or NEF is in responding to queries for the number of UEs present in a geographic location. FIG. 5 is a message flow diagram illustrating exemplary messaging exchanged for responding to a monitoring request using dynamically provisioned PLMN location mappings at an SCEF or NEF. Beginning with the upper right hand corner of the Figure, SCS/IoT AS 100 sends a monitoring request to SCEF 106 to report the number of UEs present in a geographical area. The request may identify the geographic area by common name, such as region, street address, etc. SCEF 106 may perform the following actions:

- Translate the geographical area to geo-location (latitude/longitude) using Internet-accessible APIs. For example, there are Internet web servers that will translate a city name, such as Raleigh, N.C., into longitude and latitude or GPS coordinates. Translating a common name into geographic coordinates is referred to as geocoding. An example of an Internet API that may be used to perform geocoding is the geocoding API, which is a component of the Google Maps API.
- Use geo-location to identify PLMN functions (e.g. cell-Id/eNB-Id/TAI/multimedia broadcast/multicast service (MBMS) service area identifier (SAI), etc.). This translation may be performed using the dynamically provisioned PLMN mapping database maintained by SCEF 106.
- Use the PLMN function information to identify serving MME/AMF function. This translation may also be performed using the dynamically provisioned PLMN mapping database maintained by SCEF 106.

Once SCEF 106 identifies the serving MME or AMF, SCEF 106 triggers the serving MME or AMF to report number of UEs present in the PLMN function (e.g., list of cells/RAI/LAI). The AMF or MME uses the cell ID, eNB ID, and/or RA/TA received from SCEF 106 determine the total number of UEs present in the geographic area for which the MME or AMF is responsible. Each MME or AMF contacted by SCEF 106 reports the number of UEs. SCEF 106 totals the number of UEs received from each MME or AMF and reports the total to AS 100.

Figure 6:
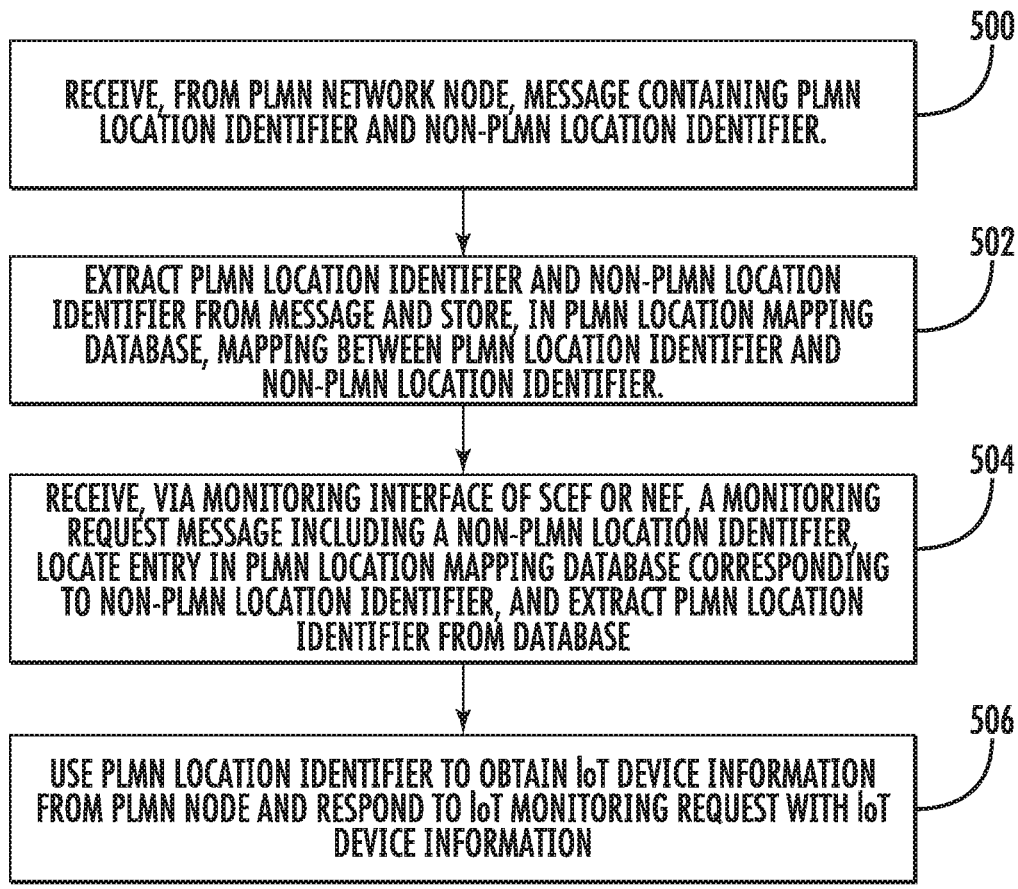
FIG. 6 is a flow chart illustrating an exemplary process for dynamically provisioning and using a PLMN location mapping database.

FIG. 6 is a flow chart illustrating an exemplary process for dynamically provisioning and using PLMN location mapping information at an SCEF or NEF. The steps illustrated in FIG. 6 may be implemented using an SCEF or NEF including at least one processor. In step 500, the process includes receiving, from a PLMN network node, a message containing a PLMN location identifier and a non-PLMN location identifier. For example, SCEF 106 or NEF 102 may receive a CMR message from an MME when an eNB connects or reconnects with the network. The CMR message may include a geographic identifier for the eNB as well as PLMN identifiers, such as a cell ID, an eNB ID, an RA, a TA, etc. In another example, SCEF 106 or NEF 102 may receive the geographic coordinates and the PLMN location identifiers from a SON system, as illustrated in FIG. 4.

In step 502, the process includes extracting he PLMN location identifier and the non-PLMN location identifier from the message and storing, in a PLMN location mapping database in the SCEF or NEF, a mapping between the PLMN location identifier and the non-PLMN location identifier. For example, SCEF 106 or NEF 102 may extract the geographic coordinates as well as the cell ID, eNB ID, RA, TA, and serving MME information from the message received from the MME or SON system.

In step 504, the process includes, receiving, via a monitoring interface of the SCEF or NEF, a monitoring request message including a non-PLMN location identifier from an AS or SCS. The monitoring event request message may be a request for determining the number of UEs currently located in a geographic area. The monitoring request message may be for one-time monitoring or continuous monitoring. The monitoring request message may identify the geographic area for which monitoring is requested by a non-PLMN name, such as a city, area within a city, geographic coordinates, or other suitable identifier.

In step 504, the process further includes locating an entry in the PLMN location mapping database corresponding to the non-PLMN location identifier and extracting a PLMN location identifier from the database. For example, if the non-PLMN location identifier is a city or other address-like identifier, SCEF 106 or NEF 102 may obtain the corresponding geographic coordinates (either latitude and longitude or GPS) via an Internet accessible API. SCEF 106 or NEF 102 may then use the geographic coordinates to perform a lookup in the PLMN location mapping database. If a matching entry is located, SCEF 106 or NEF 102 may extract the PLMN location identifiers from the entry or from entries that are linked to the entry. As illustrated in Table 1 above, these identifiers may include the cell ID, eNB ID, TA, RA, and serving MME.

In step 506, the process includes using the PLMN location information to obtain IoT device information from a node in the PLMN. For example, SCEF 106 or NEF 102 may use the PLMN location information to query the serving MMEs for each eNB identified in the location mapping information extracted from the database. The MMEs will in turn, contact the eNBs to obtain the number of UEs served by each eNB. The eNBs report their totals to the MMEs, and each MME reports its total number of UEs to SCEF 106 or NEF 102.

In step 506, the process further includes responding to the monitoring request message with the IoT device information. For example, SCEF 106 or NEF 102 may respond to the SCS or AS over the T8 interface with the number of UEs present in the geographic area.

Figure 7:
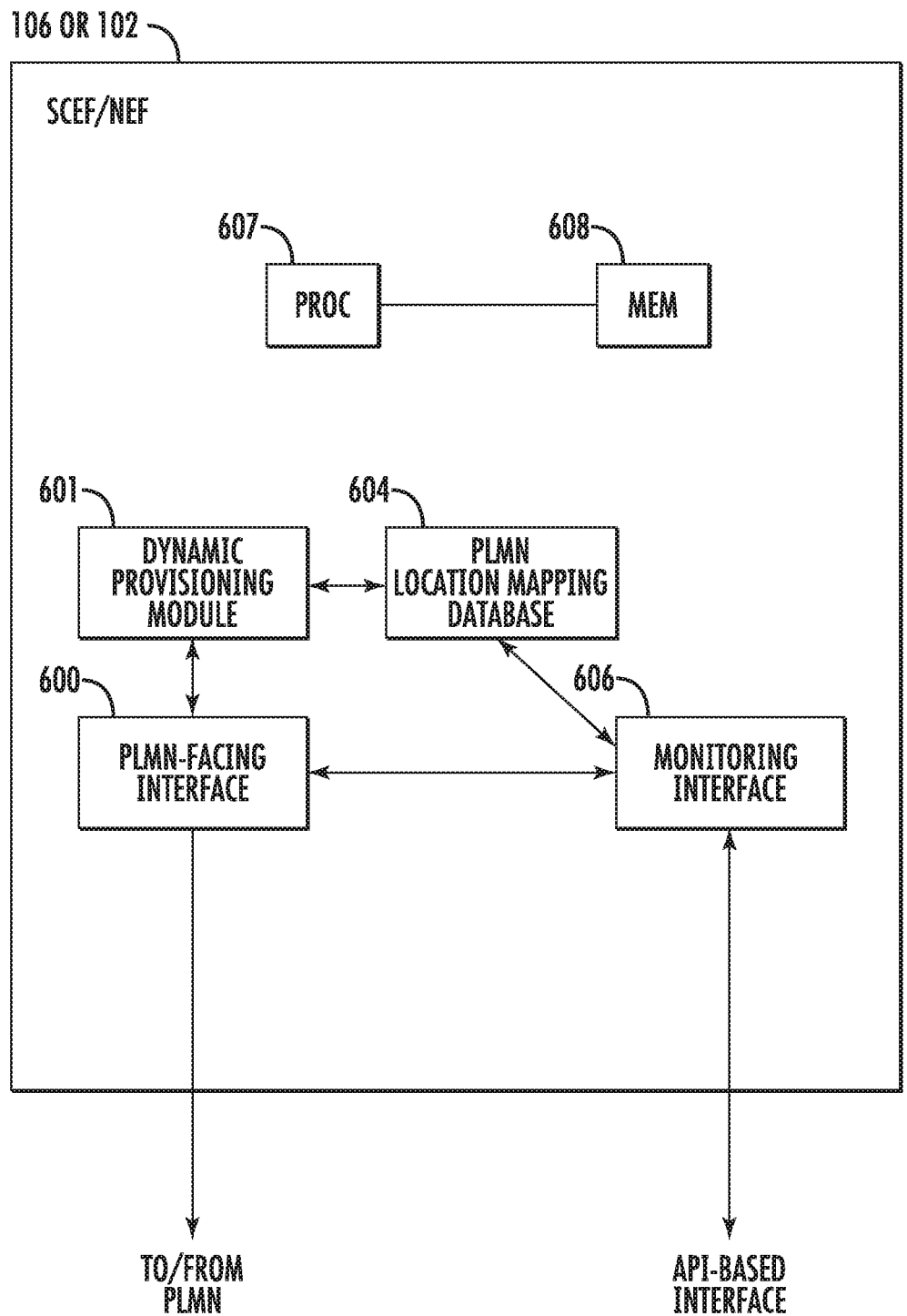
FIG. 7 is a block diagram of a standalone SCEF or NEF that includes a dynamically provisioned PLMN location mapping database.

In one example, SCEF/NEF is a standalone node. that provides SCEF or NEF services. FIG. 7 is an example of a standalone SCEF 106 or NEF 102 according to one exemplary implementation of the subject matter described herein. Referring to FIG. 7, SCEF 106 or NEF 102 includes a PLMN-facing interface 600 for receiving, from a PLMN network node, a message containing a PLMN location identifier and non-PLMN location information. In one example, PLMN-facing interface 600 is a Diameter T6a interface for receiving PLMN and non-PLMN location mapping information from an MME or a Namf event exposure service API for receiving the PLMN and non-PLMN location mapping information from an AMF. In another example, PLMN-facing interface 600 may further include an SON interface for obtaining PLMN location mapping information from a SON system, as illustrated in FIG. 4.

SCEF 106 or NEF 102 further includes a PLMN location mapping database dynamic provisioning module 602 for extracting the PLMN location information and the non-PLMN location information from PLMN messages and storing, in a PLMN location mapping database 604, a mapping between the PLMN location information and the non-PLMN location information.

SCEF 106 or NEF 102 further includes a monitoring interface 606 for receiving, from an AS, an SCS, or a 5G application function (AF), a monitoring request message including the non-PLMN location identifier. In one example, monitoring interface 606 is a T8 interface. In general, monitoring interface 606 is an API-based interface through which ASs, SCSs, and/or AFs request and receive IoT device information. Monitoring interface 606 may include functionality for responding to monitoring request messages received from SCSs and ASs. For example, monitoring interface 606 may include functionality for performing a lookup in PLMN location mapping database 604 for an entry corresponding the non-PLMN location identifier, locating an entry in PLMN location mapping database 604 corresponding to the non-PLMN location identifier, extracting a PLMN location identifier from database 604, using the PLMN location identifier to obtain IoT device information from a node in the PLMN, and responding to the monitoring request message with the IoT device information. Monitoring interface 606, after obtaining the location mapping information from database 604, may formulate the necessary queries for obtaining the requested UE information and may send the queries to MME nodes via PLMN facing interface 600. PLMN facing interface 600 may receive responses to the queries and provide the responses to monitoring interface 606. Monitoring interface 606 may aggregate the requested UE location information and provide the requested information to the SCS or AS.

Figure 8:
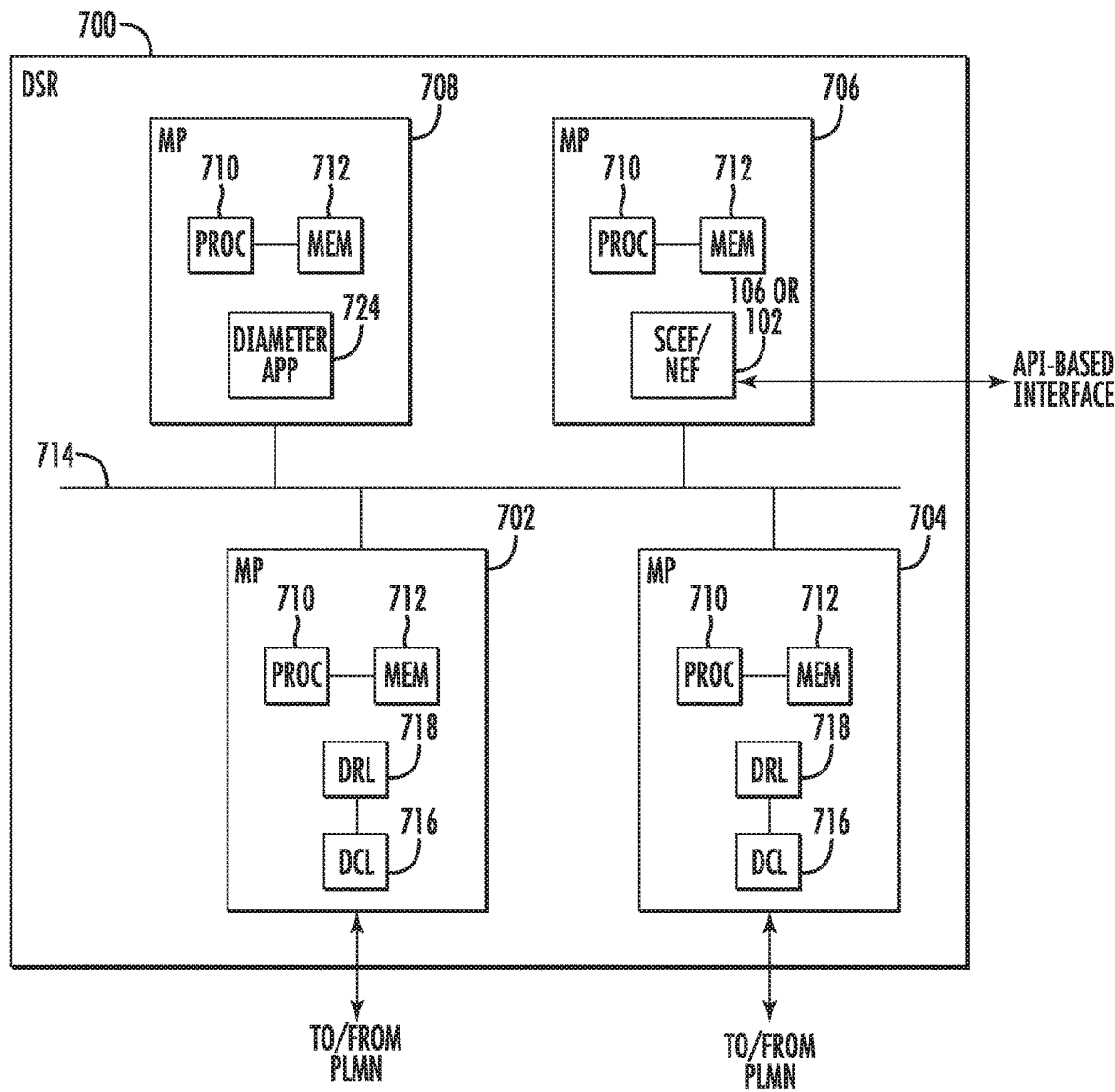
FIG. 8 is a block diagram of an SCEF or NEF that is a component of a Diameter signaling router, where the SCEF or NEF includes a dynamically provisioned PLMN location mapping database.

In the example Illustrated in FIG. 7, SCEF 106 or NEF 102 is a standalone component. In an alternate implementation, SCEF 106 or NEF 102 may be implemented as a component of a Diameter signaling router (DSR). FIG. 8 illustrates such an implementation. In FIG. 8, DSR 700 includes a plurality of message processors 702, 704, 706, and 708. Each message processor 702, 704, 706, and 708 includes a printed circuit board and at least one processor 710 and memory 712 mounted on the printed circuit board. Message processors 702, 704, 706, and 708 may exchange messages via a communications medium 714, such as an Ethernet backplane.

In the illustrated example, message processors 702 and 704 each implement a Diameter connection layer 716 and a Diameter routing layer 718. Diameter connection layer 716 establishes and maintains Diameter connections with peer Diameter nodes. Diameter routing layer 718 routes Diameter messages based on Diameter layer information, such as destination host and destination realm parameters, in the messages. Message processors 702 and 704 may be connected to PLMN nodes, such as MME 108, an AMF, and SON system 160 for receiving PLMN location mapping information for provisioning PLMN location mapping database. Message processor 706 may be connected to one or more SCSs or ASs via an API-based interface, such as a T8 interface, to receive and respond to monitoring request messages for monitoring UE location or state. The API-based interface may be a non-Diameter interface.

Message processor 706 implements SCEF 106 and/or NEF 102 and may include the components illustrated in FIG. 7. As such, message processor 706 may include PLMN location mapping database 604 illustrated in FIG. 7 and may receive PLMN and non-PLMN location mapping information for database 604 via Diameter connections with PLMN network nodes managed by a Diameter connection layer (DCL) 716 on message processors 702 and 704. In addition, message processor 706 may receive requests for UE location and state via the API-based interface and may respond to the requests using the dynamically provisioned location information stored in PLMN location mapping database 604.

Message processor 708 implements a Diameter application 724. Diameter application 724 may be any suitable Diameter application, such as a Diameter firewall application, performance monitoring application, or other suitable Diameter application.

Figure 9:
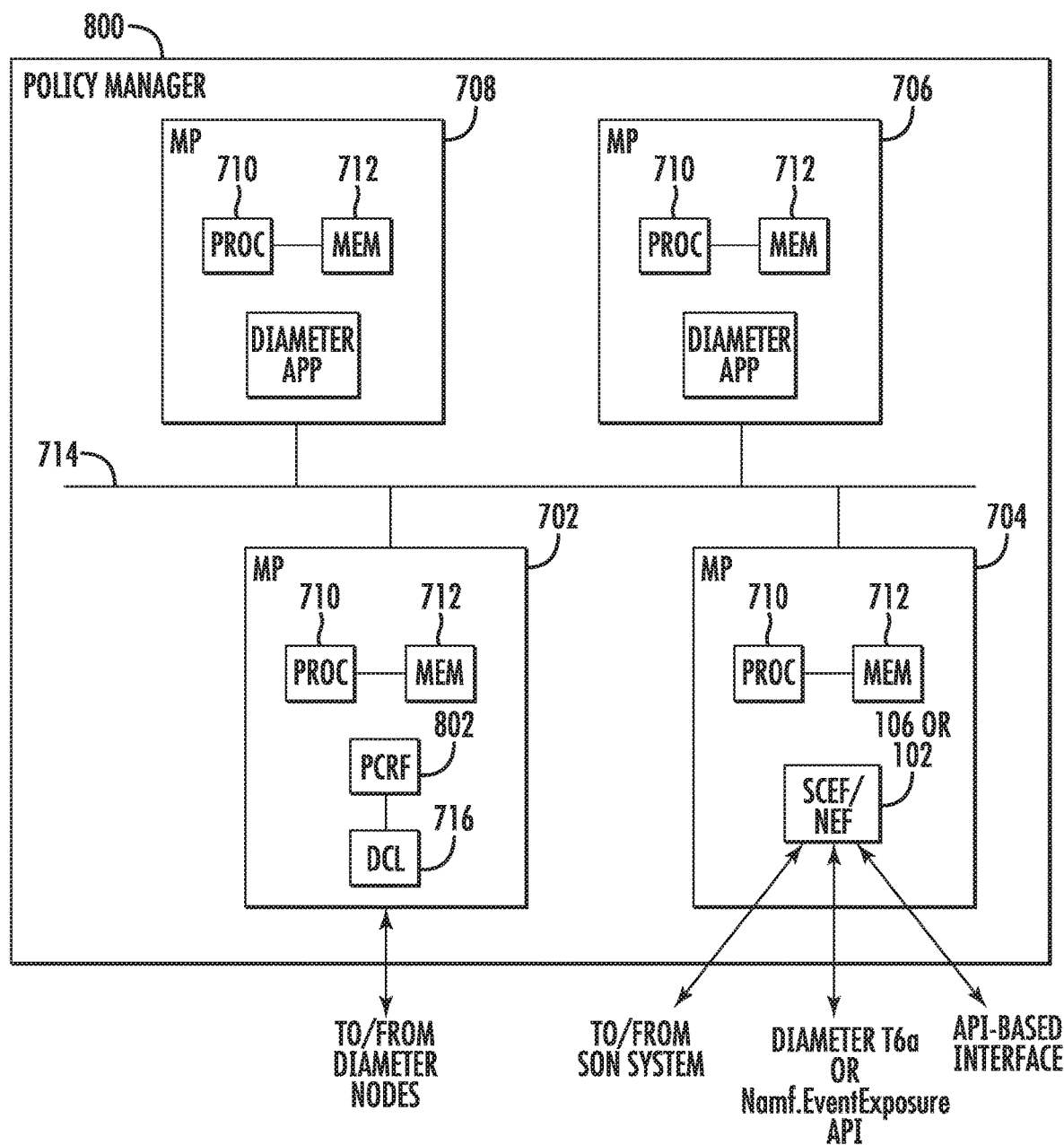
FIG. 9 is a block diagram of a policy server including an SCEF or NEF with a dynamically provisioned location mapping database.

In the example illustrated in FIG. 8, SCEF 106 or NEF 102 is component of DSR 700. In yet another alternate implementation, SCEF 106 or NEF 102 may be a component of a policy manager. FIG. 9 illustrates such an implementation. In FIG. 9, policy manager 800 includes message processors 702, 704, 706, and 708 as illustrated in FIG. 8. Each message processor 702, 704, 706, and 708 includes a processor 710 and memory 712. Message processors 702, 704, 706, and 708 may communicate via communications medium 714. However, rather than implementing Diameter routing or only Diameter routing, message processor 702 illustrated in FIG. 9 includes a policy and charging rules function (PCRF) 802 that implements PCRF functionality. PCRF functionality includes responding to policy and charging requests from Diameter nodes. Message processor 702 also implements a Diameter connection layer 716 for establishing and maintaining connections with external Diameter nodes.

Message processor 704 implements the SCEF or NEF functionality Illustrated in FIG. 6. Briefly, such functionality includes receiving subscription requests for IoT device state and location information via a monitoring interface, such as a T8 interface or other API-based interface, mapping non-PLMN location information to PLMN location information, and sending corresponding subscription requests to MMEs, AMFs, and SGSNs. The functionality implemented by SCEF 106 or NEF 102 may also include dynamically provisioning PLMN location mapping database 604 using information received from PLMN nodes, such as MMEs, SGSNs, AMFs, and SON systems via a Diameter T6a interface, a Namf event exposure service API, or a SON system interface. Message processors 706 and 708 may implement other Diameter applications such as policy related applications or non-policy related Diameter applications.

Thus, the subject matter described herein includes an SCEF or NEF with a dynamically provisionable PLMN location mapping database. Such an SCEF or NEF is a particular machine in 3GPP networks that improves the functionality of computer networks by providing a convenient and secure location for non-PLMN location information to be mapped or translated into PLMN location information. The dynamically provisionable PLMN location mapping database also improves the technological field of database management by automating the database update process using existing 3GPP messaging. Performing automated database updates using existing 3GPP messaging reduces the need for manual database configuration by humans and reduces the need to implement new interfaces for database provisioning on existing PLMN network nodes.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method for dynamically provisioning and using public land mobile network (PLMN) location mappings, the method comprising:

in a service capability exposure function (SCEF) or a network exposure function (NEF) implemented using at least one processor:
  receiving, from a PLMN network node, a message containing a PLMN location identifier and a non-PLMN location identifier;
  extracting the PLMN location identifier and the non-PLMN location identifier from the message and storing, in a PLMN location mapping database in the SCEF or NEF, a mapping between the PLMN location identifier and the non-PLMN location identifier;
  receiving, via a monitoring interface of the SCEF or NEF, a monitoring request message requesting Internet of things (IoT) device information and including a non-PLMN location identifier;
  locating an entry in the PLMN location mapping database corresponding to the non-PLMN location identifier in the monitoring request message and extracting a PLMN location identifier from the database;
  using the PLMN location identifier extracted from the database to obtain IoT device information; and
  responding to the monitoring request message with the IoT device information, wherein the monitoring request message is a request for a count of the number of user equipment (UEs) in a geographic area specified by the non-PLMN location identifier and the SCEF or NEF uses the mapping between the non-PLMN location identifier and the PLMN location identifier to contact mobility management entities (MMEs) or access and mobility management functions (AMFs) and obtain a count of UEs in the geographic area.

2. The method of claim 1 wherein receiving, from a PLMN network node, a message containing a non-PLMN location identifier and a PLMN location identifier includes receiving a Diameter connection management request (CMR) or a connection update request.

3. The method of claim 2 wherein receiving the CMR or the connection update request from a PLMN network node includes receiving the CMR or the connection update request from a mobility management entity (MME) in response to a setup request or a configuration update message, respectively, from an evolved node B (eNB).

4. The method of claim 3 wherein the non-PLMN location identifier contained in the CMR or the connection update request includes geographic coordinates of an area corresponding to the eNB and wherein the PLMN location identifier in the CMR or the connection update request comprises an eNB identifier.

5. The method of claim 4 wherein the PLMN location identifier contained in the CMR or the connection update request comprises at least one of a cell ID, a tracking area (TA), and a routing area (RA) corresponding to the geographic coordinates.

6. The method of claim 1 wherein receiving, from a PLMN network node, a message containing a PLMN location identifier and a non-PLMN location identifier includes receiving the message from a self-organizing network (SON) system used to configure evolved node Bs.

7. The method of claim 1 wherein the SCEF or NEF adds or updates PLMN location to non-PLMN location mappings to the PLMN location mapping database when an evolved node B (eNB) connects or reconnects to the PLMN and sends a setup request message to a mobility management node.

8. The method of claim 1 wherein the extracting and storing are preformed automatically by the SCEF or NEF in response to receiving the message from the PLMN network node.

9. A system for dynamically provisioning and using public land mobile network (PLMN) location mappings, the system comprising:
  a service capability exposure function (SCEF) or a network exposure function (NEF) implemented using at least one processor, the SCEF or NEF including:
    a public land mobile network (PLMN) location mapping database for storing mappings between PLMN location identifiers and non-PLMN location identifiers;
    a PLMN-facing interface for receiving, from a PLMN network node, a message containing a PLMN location identifier and non-PLMN location information;
    a dynamic PLMN location mapping database provisioning module for extracting the PLMN location identifier and the non-PLMN location identifier from the message and storing, in the PLMN location mapping database, a mapping between the PLMN location identifier and the non-PLMN location identifier; and
    a monitoring interface for receiving, from an application server (AS) or a service capability server (SCS), a monitoring request message requesting Internet of things (IoT) device information and including a non-PLMN location identifier, locating an entry in the PLMN location mapping database corresponding to the non-PLMN location identifier in the monitoring request message, extracting a PLMN location identifier from the database, using the PLMN location identifier extracted from the database to obtain the IoT device information, and responding to the monitoring request message with the IoT device information, wherein the monitoring request message is a request for a count of the number of user equipment (UEs) in a geographic area specified by the non-PLMN location identifier and the SCEF or NEF uses the mapping between the non-PLMN location identifier and the PLMN location identifier to contact mobility management entities (MMEs) or access and mobility management functions (AMFs) and obtain a count of UEs in the geographic area.

10. The system of claim 9 wherein receiving, from a PLMN network node, a message containing a non-PLMN location identifier and a PLMN location identifier includes receiving a Diameter connection management request (CMR) or a connection update request.

11. The system of claim 10 wherein receiving the CMR from a PLMN network node includes receiving the CMR or the connection update request from a mobility management entity (MME) in response to a setup request or a configuration update request, respectively, from an evolved node B (eNB).

12. The system of claim 11 wherein the non-PLMN location identifier contained in the CMR or the connection update request includes geographic coordinates of an area corresponding to the eNB and wherein the PLMN location identifier in the CMR or the connection update request comprises an eNB identifier.

13. The system of claim 12 wherein the PLMN location identifier contained in the CMR or the connection update request comprises at least one of a cell ID, a tracking area (TA), and a routing area (RA) corresponding to the geographic coordinates.

14. The system of claim 9 wherein receiving, from a PLMN network node, a message containing a PLMN location identifier and a non-PLMN location identifier includes receiving the message from a self-organizing network (SON) system used to configure evolved node Bs.

15. The system of claim 9 wherein the SCEF or NEF adds or updates PLMN location to non-PLMN location mappings to the PLMN location mapping database when an evolved node B (eNB) connects or reconnects to the PLMN and sends a setup request message to a mobility management node.

16. The system of claim 9 wherein the extracting and storing are preformed automatically by the SCEF or NEF in response to receiving the message from the PLMN network node.

17. The system of claim 9 wherein the dynamic PLMN location mapping database provisioning module is configured to associate a serving mobility management entity (MME) or access and mobility management function (AMF) identity with the mapping.

18. A non-transitory computer readable medium having stored thereon executable instructions that when executed by a processor of a computer controls the computer to perform steps comprising:

in a service capability exposure function (SCEF) or a network exposure function (NEF) implemented using at least one processor:

receiving, from a PLMN network node, a message containing a PLMN location identifier and a non-PLMN location identifier;

extracting the PLMN location identifier and the non-PLMN location identifier from the message and storing, in a PLMN location mapping database in the SCEF or NEF, a mapping between the PLMN location identifier and the non-PLMN location identifier;

receiving, via a monitoring interface of the SCEF or NEF, a monitoring request message requesting Internet of things (IoT) device information and including a non-PLMN location identifier;

locating an entry in the PLMN location mapping database corresponding to the non-PLMN location identifier in the monitoring request message and extracting a PLMN location identifier from the database;

using the PLMN location identifier extracted from the database to obtain IoT device information; and responding to the monitoring request message with the IoT device information, wherein the monitoring request message is a request for a count of the number of user equipment (UEs) in a geographic area specified by the non-PLMN location identifier and the SCEF or NEF uses the mapping between the non-PLMN location identifier and the PLMN location identifier to contact mobility management entities (MMEs) or access and mobility management functions (AMFs) and obtain a count of UEs in the geographic area.

* * * * *